United States Patent [19]

Simpson

[11] Patent Number: 4,969,990
[45] Date of Patent: Nov. 13, 1990

[54] HYDROPROCESSING WITH A CATALYST HAVING A NARROW PORE SIZE DISTRIBUTION

[75] Inventor: Howard D. Simpson, Irvine, Calif.

[73] Assignee: Union Oil Company of California, Los Angeles, Calif.

[21] Appl. No.: 401,037

[22] Filed: Aug. 31, 1989

Related U.S. Application Data

[62] Division of Ser. No. 213,079, Jun. 29, 1988, Pat. No. 4,886,582.

[51] Int. Cl.$^5$ .............................................. C10G 45/08
[52] U.S. Cl. ........................ 208/216 PP; 208/216 R; 208/213; 208/208 R; 208/209; 208/251 R; 208/254 H
[58] Field of Search ............... 208/216 R, 213, 208 R, 208/209, 216 PP, 251 R, 254 H

[56] References Cited

U.S. PATENT DOCUMENTS

| | | | |
|---|---|---|---|
| 3,242,101 | 3/1966 | Erickson et al. | 502/314 |
| 3,980,552 | 9/1976 | Mickelson | 208/216 |
| 4,048,060 | 9/1977 | Riley | 208/210 |
| 4,066,574 | 1/1978 | Tamm | 502/314 X |
| 4,186,078 | 1/1980 | Itoh et al. | 208/216 PP |
| 4,267,071 | 5/1981 | Jaffe | 208/216 PP |
| 4,306,965 | 12/1981 | Hensley et al. | 502/314 X |
| 4,341,625 | 7/1982 | Tamm | 208/216 PP |
| 4,351,717 | 9/1982 | Jaffe | 208/216 PP |
| 4,500,424 | 2/1985 | Simpson | 208/216 PP |
| 4,540,483 | 9/1985 | Simpson | 208/216 PP |
| 4,581,126 | 4/1986 | Day et al. | 208/216 PP |
| 4,600,703 | 7/1986 | Morales et al. | 502/210 |
| 4,652,545 | 3/1987 | Lindsley et al. | 208/216 PP |
| 4,686,030 | 8/1987 | Ward | 208/216 PP |
| 4,738,944 | 4/1988 | Robinson et al. | 208/216 PP |
| 4,786,403 | 11/1988 | Kemp | 208/216 PP |
| 4,832,828 | 5/1989 | Kemp | 208/216 PP |
| 4,839,028 | 6/1989 | Kemp | 208/216 PP |
| 4,846,961 | 7/1989 | Robinson et al. | 208/216 PP |

FOREIGN PATENT DOCUMENTS 0126250 11/1984 European Pat. Off. .

*Primary Examiner*—Patrick P. Garvin
*Assistant Examiner*—E. P. Irzinski
*Attorney, Agent, or Firm*—Alan H. Thompson; Gregory F. Wirzbicki

[57] ABSTRACT

A catalyst useful for hydroprocessing a hydrocarbon-containing oil contains at least one hydrogenation component on an amorphous, porous refractory oxide. The catalyst is prepared by impregnating support particles having a narrow pore size distribution and a mode pore diameter from abpit 70 to 80 angstroms with a solution containing a precursor of the hydrogenation components, followed by drying and calcining. The catalyst is useful for promoting a number of hydrocarbon hydroprocessing reactions, particularly hydrogenative desulfurization, dedemetallization and denitrogenation, and most particularly, hydrodesulfurization of residuum-containing oils.

43 Claims, No Drawings

HYDROPROCESSING WITH A CATALYST HAVING A NARROW PORE SIZE DISTRIBUTION

This application is a division of Ser. No. 213,079 filed June 9, 1988, now U.S. Pat. No. 4,886,582.

BACKGROUND OF THE INVENTION

1. Field of the Invention

This invention relates to hydrocarbon hydroprocessing catalysts, such as those utilized to catalyze the reaction of hydrogen with organo-nitrogen, organo-metallic and particularly organo-sulfur compounds. More particularly this invention is directed to a catalyst useful for the hydrodesulfurization of hydrocarbons, such as residuum oils, and to a method for preparing such catalysts by employing an aqueous impregnating solution with porous, amorphous refractory oxide support particles. The invention is especially directed to catalysts of high overall desulfurization activity.

2. Description of the Prior Art

In the refining of hydrocarbons, it is often necessary to convert a hydrocarbon-containing oil fraction to different forms. Typically, particulate catalysts are utilized to promote desulfurization, denitrogenation or demetallization reactions when feedstocks such as residuum-containing oils are contacted with catalysts under conditions of elevated temperature and pressure and in the presence of hydrogen so that the sulfur components are converted to hydrogen sulfide, the nitrogen components to ammonia and the metals are deposited on the catalyst.

Hydroprocessing of hydrocarbon-containing oils may be carried out with a catalyst containing Group VIB and Group VIII hydrogenation metals on a refractory oxide support. Compositions containing these and other elements have been previously prepared by comulling and impregnation methods. For example, catalysts useful for hydroprocessing residuum-containing oils comprising a Group VIB metal, particularly molybdenum or tungsten, and a Group VIII metal, particularly cobalt or nickel, on an alumina base have been disclosed in U.S. Pat. Nos. 3,980,552, and 4,460,707. In U.S. Pat. No. 3,980,552, a catalyst having an average pore diameter between 40 and 100 angstroms is prepared by comulling precursors of the hydrogenation metals with those of the support materials. The catalyst in U.S. Pat. No. 4,460,707 has an average pore diameter greater than about 180 angstroms and is prepared by impregnation, that is, by deposition of the active components on the support base by contact thereof with an aqueous solution containing the hydrogenation components in dissolved form. Such catalysts have been previously effective for removing contaminant metals and sulfur from residuum-containing oils.

Although conventional catalysts are active and stable for hydrocarbon hydroprocessing reactions, catalysts of yet higher activities and stabilities are still being sought. Increasing the activity of a catalyst increases the rate at which a chemical reaction proceeds under given conditions, and increasing the stability of a catalyst increases its resistance to deactivation, that is, the useful life of the catalyst is extended. In general, as the activity of a catalyst is increased, the conditions required to produce a given end product, such as a hydrocarbon of given sulfur, nitrogen, and/or contaminant metals content, become more mild. Milder conditions require less energy to achieve the desired product, and catalyst life is extended due to such factors as lower coke formation or the deposition of less metals.

SUMMARY OF THE INVENTION

Briefly, the invention provides for a catalyst useful for hydroprocessing hydrocarbon-containing oils and a method for preparing such a catalyst employing an impregnating solution and porous refractory oxide support particles having a narrow pore size distribution wherein a mode pore diameter is in the range from about 65 to about 85 angstroms. In one embodiment, a catalyst obtained from impregnation of such support particles contains at least one metal hydrogenation component in an amount less than 15 weight percent (calculated as a trioxide) supported on the amorphous, porous refractory oxide. The catalyst has a pore size distribution wherein (1) at least 75 percent of the total pore volume is in pores of diameter from about 20 angstroms above to about 20 angstroms below a mode pore diameter in the range from 70 to 90 angstroms, (2) at least 3 percent to less than 10 percent of the total pore volume is in pores of diameter greater than 110 angstroms, and (3) less than 10 percent of the total pore volume is in pores of diameter less than 60 angstroms.

In a preferred embodiment, a hydroprocessing catalyst is prepared by the method of impregnating alumina-containing support particles having a narrow pore size distribution with an aqueous impregnating solution comprising a dissolved molybdenum component and a dissolved nickel or cobalt component, followed by calcination. In this embodiment the catalyst contains about 10 to about 14 weight percent of molybdenum components (as $MoO_3$) and about 0.01 to about 6 weight percent of cobalt or nickel components (calculated as the monoxide) and has porosity characteristics including at least 80 percent of the total pore volume in pores of diameter from about 20 angstroms above or below a mode pore diameter of 75 to 90 angstroms and about 7 to about 10 percent of the total pore volume in pores of diameter greater than 110 angstroms.

Catalysts prepared in accordance with the invention are useful for promoting the hydroprocessing of hydrocarbon-containing oils, and particularly for hydrodesulfurizing residuum-containing oils. A catalyst prepared with the support particulates described above exhibits high activity when utilized to promote high conversions of organo-sulfur compounds, particularly those found in hydrocarbon residuum-containing oils, to hydrogen sulfide.

DETAILED DESCRIPTION OF THE INVENTION

The invention is directed to a catalyst, usually a catalyst useful for hydroprocessing a hydrocarbon-containing oil. The catalyst is particularly well suited for hydrodesulfurization of a residuum-containing oil. The catalyst typically contains up to 15 weight percent of at least one active metal hydrogenation component (calculated as the metal al trioxide), ordinarily a metal component selected from the group consisting of Group VIB metals and Group VIII metals on any number of non-zeolitic support particles comprising a porous, amorphous refractory oxide.

Support particles suitable for use herein include such porous amorphous refractory oxides as silica, magnesia, silica-magnesia, zirconia, silica-zirconia, titania, silica-titania, alumina, silica-alumina, lithium-alumina, phosphorus-alumina, lithium-phosphorus-alumina, etc., with supports containing alumina being highly preferred. Supports containing gamma alumina are the most highly preferred, particularly those supports containing at least 90, and even more preferably at least 95 weight percent of gamma alumina. Preferred support particles having the preferred physical characteristics disclosed herein are commercially available from Nippon-Ketjen Catalyst Division of AKZO-Chemie, and American Cyanamid, Inc. Mixtures of the foregoing refractory oxides are also contemplated, especially when prepared as homogeneously as possible.

The amorphous, porous refractory oxide support material is usually prepared in the form of shaped particulates, with the preferred method being to extrude a precursor of the desired support through a die having openings therein of desired size and shape, after which the extruded matter is cut into extrudates of desired length. The precursor may be a refractory oxide gel such as a spray-dried or peptized alumina gel. The support particles may also be prepared by mulling (or pulverizing) a pre-calcined porous refractory oxide to a particle size less than about 100 microns and extruding the material. Also, the support particles may be prepared by extruding a combination of precursor gel and mulled pre-calcined porous refractory oxide in a weight ratio in the range from about 1:20 to about 20:1

The support particles prepared in the form of gel extrudates are generally pre-calcined prior to impregnation, especially if gamma alumina is the desired support material. Temperatures above about 900° F. are usually required to convert (calcine) the precursor of the desired support to the porous, amorphous refractory oxide form, as for example, the conversion of alumina gel to gamma alumina Usually, temperatures above about 1,100° F. are utilized to effect this transformation, with holding periods of one-half to three hours generally being utilized to produce preferred gamma alumina extrudates The extruded particles may have any cross-sectional shape, i.e., symmetrical or asymmetrical, but most often have a symmetrical cross-sectional shape, preferably a cylindrical or polylobal shape. The cross-sectional diameter of the particles is usually about 1/40 to about ⅛ inch, preferably about 1/32 to about 1/12 inch, and most preferably about 1/24 to about 1/15 inch. Among the preferred catalyst configurations are cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. Other preferred particulates are those having quadralobal cross-sectional shapes, including asymmetrical shapes, and symmetrical shapes such as in FIG. 10 of U.S. Pat. No. 4,028,227. Other particulates are available from Davison Chemical Company, a division of W. R. Grace & Company, having ring and monolith shapes, as disclosed in U.S. Pat. No. 4,510,261.

An impregnating solution containing at least one hydrogenation component precursor may be utilized to incorporate the catalytically active hydrogenation components with any of the amorphous, porous refractory support particles. A variety of the preferred Group VIB metal components may be utilized to produce a stable impregnating solution. In general, all Group VIB metal compounds soluble in aqueous media, particularly those of molybdenum or tungsten, may be utilized. The oxides of molybdenum (e.g., molybdenum trioxide) are preferred, as are many salts containing molybdenum, particularly precursors of molybdenum trioxide. Also useful are salts containing both a Group VIB metal and ammonium ion, such as ammonium dimolybdate, and most preferably ammonium heptamolybdate. Suitable Group VIII metal compounds are water-soluble, and usually include an oxide, carbonate, and preferably a nitrate of cobalt, nickel, and iron, or combinations thereof. The nitrates of cobalt and nickel are preferred. Preferably, the final solution contains Group VIII components (as the monoxide) in a total concentration between about 0.01 and 10 weight percent and more preferably about 1 to about 6 weight percent. Although not usually remaining on the final catalyst composition, citric acid may often be employed in the impregnating solution in combination with the hydrogenation components, and particularly when the pH of the impregnating solution is less than 1.0.

Several methods may be employed to impregnate the catalytic support particles with an impregnating solution. One such method, commonly referred to as the spray impregnation technique, involves spraying the support with the impregnating solution. Another impregnating method, often used to maintain relatively low concentrations of hydrogenation components in the solution, is the circulation or multi-dip procedure wherein the support is repeatedly contacted with the impregnating solution with or without intermittent drying Preferred methods, however, require soaking the support in an impregnating solution or circulating the support therein, as for example, the pore volume or pore saturation technique, the continuous solution impregnation (CSI) technique and the like. The pore saturation method involves dipping the catalyst support into an impregnating solution having a volume usually sufficient to fill the pores of the support and, on occasion, may be up to about 10 percent excess. The concentrations of hydrogenation components in the solution during impregnation by this technique may be somewhat higher than those utilized in other methods because the ratios of hydrogenation components in the final catalyst are determined directly by solution composition.

The amounts of active hydrogenation components retained on the support particles during impregnation will depend largely on physical characteristics of the support particles, inter alia, surface area, pore volume and pore size distribution. Broadly speaking, the support particles have a surface area of about 10 to about 400 m²/gram and typically above 100 m²/gram, and preferably about 125 m²/gram to about 400 m²/gram (as measured by the B.E.T. method). The total pore volume of the amorphous support, as measured by conventional mercury porosimeter methods, is usually about 0.35 to about 0.8 cc/gram, preferably about 0.4 to about to about 0.7 cc/gram, and most preferably between about 0.45 and about 0.7 cc/gram.

Physical characteristics of the support particles utilized to prepare the catalyst of the invention, as determined by conventional mercury porosimeter testing methods, typically include a narrow pore size distribution wherein at least 75, preferably at least 80, and most preferably at least 85 percent of the total pore volume is in pores of diameter from about 20 angstroms below the mode pore diameter to about 20 angstroms above the mode pore diameter. On a pore volume basis, the support ordinarily has at least about 0 35 cc/gram, preferably at least about 0.4 cc/gram, and most preferably at least about 0.45 cc/gram of the total pore volume in pores of diameter from about 20 angstroms below the mode pore diameter to about 20 angstroms above the mode pore diameter. Also, the support usually has at least 60 percent, and preferably at least 65 percent of the total pore volume in pores of diameter from about 10 angstroms above the mode pore diameter to about 10 angstroms below the mode pore diameter. On a pore volume basis, at least 0.6 cc/gram and preferably at least 0.65 cc/gram of the total pore volume is in pores of diameter from 10 angstroms above to 10 angstroms below the mode pore diameter. The mode pore diameter, as referred to herein, is the pore diameter represented on a pore size distribution curve of a support or catalyst at which the derivative of the total pore volume (cc/g.) plotted on the ordinate vs. the pore diameter (angstroms) plotted on the abscissa is a maximum. The mode pore diameter of the support particles usually lies in the range from about 65 to about 85 angstroms and preferably from 70 to 85 angstroms.

An unusual feature of the pore size distribution of the support is the amount of total pore volume in pores of diameter greater than about 110 angstroms. The support ordinarily has at least about 4 percent, or, in the alternative, usually at least about 0.025 cc/gram of the total pore volume in pores of diameter greater than 110 angstroms, yet does not contain more than about 10 percent of the total pore volume in pores of diameter greater than 110 angstroms. Also, the support contains less than 15 percent, preferably less than 12 percent, or, in the alternative, less than about 0.085 cc/gram and preferably less than 0.08 cc/gram, of the total pore volume in pores of diameter less than 60 angstroms. Physical characteristics of two preferred amorphous refractory oxide supports utilized in preparation of catalysts of the invention are summarized in Table I as follows:

TABLE I

| Pore Diameter Angstroms | Support N cc/gram | % PV | Support M cc/gram | % PV |
|---|---|---|---|---|
| <40 | 0 | 0 | 0 | 0 |
| 40–50 | 0.002 | 0.3 | 0.019 | 3.5 |
| 50–60 | 0.026 | 4.1 | 0.059 | 10.9 |
| 60–70 | 0.112 | 17.5 | 0.195 | 35.9 |
| 70–80 | 0.378 | 59.0 | 0.178 | 32.8 |
| 80–90 | 0.083 | 13.0 | 0.037 | 6.8 |
| 90–100 | 0.003 | 0.5 | 0.005 | 0.9 |
| 100–110 | 0.004 | 0.6 | 0.007 | 1.3 |
| >110 | 0.032 | 5.0 | 0.043 | 7.9 |
| PORE VOLUME cc/gram (Merc. Poros.) | 0.640 | | 0.543 | |
| MODE PORE DIAMETER, Å (Merc. Poros.) | 73 | | 70 | |
| SURFACE AREA m²/gram (B.E.T. method) | 300 | | 290 | |

After impregnation, the support is dried and calcined to produce a catalyst containing the hydrogenation components in desired proportions. Calcination is usually at a temperature of at least 700° F., and preferably from about 750° F. to about 1,400° F., so as to convert the hydrogenation metals to their oxide forms. However, impregnated support particles containing a significant portion of nickel are calcined at a temperature preferably less than about 1000° F., although support particles containing significant amounts of cobalt may preferably be calcined up to about 1,400° F. Furthermore, when calcining support particles impregnated with a solution containing a Group VIII metallic nitrate, flowing air is usually passed at a sufficient rate over the support particles to remove the nitrogen oxide NO and $NO_2$ produced by the reactions associated with nitrate component decomposition.

The final composition of the catalyst of the invention contains at least one metal hydrogenation component on the support particles. The physical characteristics of the final catalyst composition will usually vary from those of the support particles by less than about 25 percent. The final composition generally contains less than 15 weight percent, and usually in the range from about 1 to about 15 weight percent, of at least one metal hydrogenation component, calculated as the metal trioxide. A preferred catalyst contains a Group VIB metal component and/or a Group VIII metal component, usually in the range from about 10 to about 14 weight percent calculated as the trioxide, and about 1 to about 6 weight percent, calculated as the monoxide, respectively. The preferred Group VIB metal components include molybdenum and tungsten, with molybdenum the most highly preferred. The preferred Group VIII metal components include cobalt and nickel. Another component which may be included in the catalyst is a phosphorus component, usually in an amount from about 0.01 to about 1 weight percent, calculated as P.

In accordance with the invention, a catalyst is prepared so as to have a narrow pore size distribution wherein at least 75 percent, or, in the alternative, at least 0.35 cc/gram of the total pore volume is in pores of diameter from about 20 angstroms below the mode pore diameter to about 20 angstroms above the mode pore diameter. The mode pore diameter is usually in the range from about 70 to about 90 angstroms, less than about 10 percent of the total pore volume is contained in pores of diameter less than 60 angstroms, and about 3 to about 10 percent of the total pore volume is contained in pores of diameter greater than 110 angstroms. Furthermore, the catalyst may have a pore size distribution wherein at least 80 percent of the total pore volume is in pores of diameter from about 20 angstroms below the mode pore diameter to about 20 angstroms above the mode pore diameter, less than 10 percent of the total pore volume is in pores of diameter less than 60 angstroms and greater than about 4 percent to less than about 10 percent of the total pore volume is in pores of diameter greater than 110 angstroms. Physical characteristics of the catalyst of the invention including pore size distribution, mode pore diameter (mpd) surface area and total pore volume are summarized in Table II.

TABLE II

| Physical Characteristics of Catalyst | | | |
|---|---|---|---|
| Pore Size Distribution Diameter in Angstroms | % of Total Pore Volume | | |
| | Broad | Preferred | Most Pref. |
| <60 | <10 | <9 | <7 |
| >110 | >3 | 4–10 | 5–10 |
| 50–100 | >75 | >85 | >90 |
| mpd ± 20 | >75 | >80 | >85 |
| mpd ± 10 | >50 | >55 | >60 |
| >90 | >10 | >12 | >14 |
| >100 | >5 | >6 | >7 |
| mpd | 70–90 | 75–90 | 75–85 |

The total pore volume of the final catalyst of the invention preferably is greater than 0.45 cc/gram. On a pore volume basis, ranges of porosity characteristics of such preferred catalysts are summarized in Table IIA.

TABLE IIA

Physical Characteristics of Catalyst

| Pore Size Distribution Diameter in Angstroms | cc/gram of Total Pore Volume | | |
|---|---|---|---|
| | Broad | Preferred | Most Pref. |
| <60 | <0.055 | <0.050 | <0.046 |
| >110 | >0.014 | >0.015 | >0.023 |
| 50–100 | >0.34 | >0.37 | >0.40 |
| mpd ± 20 | >0.34 | >0.39 | >0.42 |
| mpd ± 10 | >0.20 | >0.25 | >0.28 |
| >90 | >0.03 | >0.06 | >0.07 |
| >100 | >0.01 | >0.03 | >0.04 |

One of the unusual features of the catalyst of the invention is the combination of the following porosity characteristics: (1) a substantial amount of pore volume within both 10 and 20 angstroms from a mode pore diameter in the range from 70 to 90 angstroms, (2) a relatively small amount of pore volume, i.e., less than 10 percent, in pores of diameter less than 60 angstroms, and (3) a significant amount of pore volume in pores of diameter greater than 110 angstroms, i.e., at least 3 percent, and preferably at least about 7 percent (or greater than 0.030 cc/gram) up to about 10 percent of the total pore volume. It is theorized, at least for hydrodesulfurization purposes, that minimizing the number of minipores (60 angstrom diameter or smaller) and maximizing the number of macropores (110 angstrom diameter or larger) up to a limit of about 10 percent of the total pore volume contributes to available surface area in pores of diameter allowing sulfur-containing molecules to penetrate into the catalyst; the invention, however, is not limited to this or any other theory of operation.

After calcination, the final catalyst is generally activated by conventional means for its intended use in a given hydroprocess of a hydrocarbon-containing oil. The catalyst may, for example, be activated by reduction of the metal hydrogenation components to the free metal form, employed in the calcined oxide form or converted from the oxide form to the sulfide form. When employed with active components in the sulfide form, the catalyst may be presulfided so as to convert the active metal components to the corresponding sulfides. Usually the catalysts are presulfided prior to use by contact with a stream of sulfiding gas, such as hydrogen sulfide-hydrogen mixtures containing about 1 to 10 volume percent of hydrogen sulfide, at temperatures between about 200° F. and 1,200° F. Although presulfiding of the catalyst is preferred, it is not essential, as the catalyst may be sulfided "in situ" in a short time by contact with a sulfur-containing feedstock processed under hydroprocessing conditions.

The catalyst of the invention may be employed in any of several processes for hydroprocessing hydrocarbon containing oils wherein catalytic composites containing Group VIB and/or Group VIII metals are known to be catalytically effective, such as hydrogenation, dehydrogenation, hydrodesulfurization, oxidation, hydrodenitrogenation, hydrodemetallization cracking, mild hydrocracking, hydroreforming, and the like. Contemplated for treatment by the process of the invention are relatively high boiling hydrocarbon-containing oils including crude petroleum oils and synthetic crudes. Among the typical oils contemplated are top crudes, vacuum and atmospheric residual fractions, light and heavy atmospheric and vacuum distillate oils, deasphalted oils, shale oils, and oils from bituminous sands, coal compositions and the like. For use herein, typical hydrocarbon-containing oils, or mixtures thereof, may contain at least about 10 volume percent of components normally boiling above about 1050° F. and in some cases, at least 20 volume percent Other hydrocarbon-containing oils include lubricating oils, waxes, kerosene, solvent naphthas, fuel oils, diesel fuels, jet fuels, heavy naphthas, light naphthas, cycle oils from cracking operations, coker distillates, cracked gasoline, decant oils, and the like.

Although virtually any high boiling hydrocarbon-containing feedstock may be treated by hydroprocessing with the catalyst of the invention, the process is particularly suited to treating residuum-containing oils, i.e., heavy residual fractions, especially the atmospheric and vacuum residuum oils containing at least about 2 ppmw of contaminant metals (vanadium, nickel, and the like). Sulfur is usually present in such oils in a proportion exceeding 0.1 weight percent and often exceeding 1.0 weight percent. A particularly preferred proportion of sulfur is about 1 to about 8 weight percent. The feedstock contains undesirable proportions of nitrogen, usually in a concentration greater than about 2 ppmw and often between about 2 ppmw and 5000 ppmw. Ordinarily the feedstock contains less than 200 ppmw of nickel and vanadium contaminant metals, calculated as Ni plus V, with preferred feedstocks containing less than 100 ppmw and most preferably less than 50 ppmw of said materials. The feedstock may contain waxy components, e.g., n-paraffins and slightly-branched paraffins, and thus have a high pour point, e.g., at least about 30° F.

The catalyst may be employed as either a fixed, ebullating, slurried or fluidized bed (but most usually a fixed bed) of particulates in a suitable reactor vessel wherein the hydrocarbon oil to be treated is introduced and subjected to hydroprocessing conditions including an elevated total pressure, temperature, and hydrogen partial pressure. Under such conditions, the hydrocarbon oil and catalyst are subjected to a hydrogen partial pressure usually in the range from about 100 to about 4,000 p.s.i.g. at a space velocity usually in the range from about 0.05 to about 20 LHSV so as to effect the desired degree of hydroprocessing, as for example, demetallization, desulfurization and/or denitrogenation, i.e., so as to effect the desired degree of conversion of, for example, sulfur, nitrogen and metal-containing compounds to hydrogen sulfide, ammonia, and metal forms capable of being deposited in the catalyst, respectively. The catalyst of the invention is particularly effective for desulfurization, denitrogenation and demetallization reactions, especially when utilized to process hydrocarbon oils such as residuum fractions.

In the hydroprocessing of a hydrocarbon oil, the catalyst is usually maintained in a hydroprocessing reactor as a fixed bed with the feedstock passing downwardly once therethrough. In some instances, one or more additional reactors may be added to the single reactor, either in series or parallel. If the feedstock is unusually high in organometallic compounds, it may be pretreated, integrally or separately, using a conventional hydrodemetallization catalyst or a hydrodemetallization catalyst of the invention and particularly, a hydrodemetallization catalyst having a substantial amount of pore volume in pores of diameter greater than that corresponding to the mode pore diameter of the catalyst of the invention.

Typical hydroprocessing conditions that are suitable for hydrodenitrogenation, hydrodesulfurization, or that yield less than about 10 volume percent conversion of the oil fraction boiling above 1050° F. to liquid products boiling at or below 1050° F., are shown in the following Table III:

TABLE III

| Operating Conditions | Suitable Range | Preferred Range |
| --- | --- | --- |
| Temperature, °F. | 500–900 | 600–850 |
| Hydrogen Pressure, p.s.i.g. | 200–4,000 | 500–2,500 |
| Space Velocity, LHSV | 0.05–5.0 | 0.1–3.0 |
| Hydrogen Recycle Rate, scf/bbl | 500–15,000 | 1,000–10,000 |

Generally, the hydrogen partial pressure maintained during hydroprocessing is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

The hydroprocess of the invention may include either serial or simultaneous desulfurization and denitrogenation of a feedstock. Simultaneous desulfurization, denitrogenation and heavy component (1050° F. plus components) conversion, as used herein, involves contacting a hydrocarbon-containing feedstock with the particulate catalyst disclosed herein under conditions effecting (1) a lower sulfur and nitrogen content in the effluent and (2) a higher percentage of liquid products boiling at or below 1050° F. in the effluent as compared to the feedstock. Serial desulfurization and denitrogenation of a feedstock by contact with the catalyst of the invention involves removing sulfur and nitrogen from the feedstock either prior to or after contact of the feedstock with a catalyst effective for removing a substantial proportion of contaminant metals from the feed.

A preferred embodiment utilizing the catalyst of the invention comprises a combined hydrodemetallation, hydrodesulfurization and hydrodenitrogenation reaction zone wherein the catalyst of the invention is located in a downstream portion of a fixed bed relative to an upstream catalyst bed portion containing a demetallation catalyst having an average pore diameter of at least 30 angstroms greater than that of the catalyst of the invention. In contrast to utilizing a comparable conventional narrow pore sized catalyst in the downstream location of the catalyst bed, the catalyst of the invention exhibits better activity for removing nitrogen, sulfur, and conversion of 1050° F.+ components to 1050° F.— components in the hydrocarbon-containing feed.

The invention is further illustrated by the following examples which are illustrative of specific modes of practicing the invention and are not intended as limiting the scope of the invention as defined in the appended claims.

EXAMPLE I

Catalysts A and B, prepared in accordance with the invention, are tested under typical hydrodesulfurization conditions against a commercial hydrodesulfurization catalyst, Catalyst X. Catalysts A, B and X have a 1/20 inch trilobal cross-sectional shape and have nominal compositions of 12.0 weight percent of molybdenum components, calculated as $MoO_3$, and 3.0 weight percent of cobalt components, calculated at CoO, and the balance of gamma alumina. Catalysts A and B of the invention are prepared as follows:

An impregnating solution of the invention is prepared by placing 23.74 grams of ammonium heptamolybdate (AHM) in a beaker containing 45 ml of water. With vigorous stirring, 18.78 grams of citric acid (monohydrate) is added, and all of the solids are dissolved. Cobalt nitrate $(Co(NO_3)_2.6H_2O)$ in the amount of 18.59 grams is then dissolved in the resulting solution. After dissolution of the cobalt nitrate, an impregnating solution having a volume of 88 ml is prepared. The procedure is repeated to produce two impregnating solutions having the same final volume.

Two 125 gram portions of gamma alumina support particles M (preparation of Catalyst A) and N (preparation of Catalyst B), having pore size distributions as shown in Table I herein, are then contacted with the impregnating solution. Substantially all 88 ml of each impregnating solution is taken up by each of the supports.

The impregnated composition is allowed to stand (age) for two hours following which it is oven dried at 110° C. and then calcined at 1,022° F. for ½ hour in flowing air. The final catalysts of the invention, Catalysts A and B, and conventional Catalyst X, have pore size distributions as shown in Table IV.

TABLE IV

| PORE SIZE DISTRIBUTIONS AND SURFACE AREAS | | | | | | |
| --- | --- | --- | --- | --- | --- | --- |
| Pore Diameter, Angstroms | Catalyst X | | Catalyst A | | Catalyst B | |
| | P.V. | % | P.V. | % | P.V. | % |
| <40 | 0 | 0 | 0 | 0 | 0 | 0 |
| 40–50 | 0.006 | 1.2 | 0.002 | 0.9 | 0.007 | 1.3 |
| 50–60 | 0.054 | 10.5 | 0.033 | 6.3 | 0.016 | 3.1 |
| 60–70 | 0.132 | 25.8 | 0.095 | 18.3 | 0.037 | 7.1 |
| 70–80 | 0.160 | 31.3 | 0.204 | 39.2 | 0.098 | 18.9 |
| 80–90 | 0.105 | 20.5 | 0.110 | 21.2 | 0.284 | 54.6 |
| 90–100 | 0.027 | 5.3 | 0.026 | 5.0 | 0.035 | 6.7 |
| 100–110 | 0.013 | 2.5 | 0.009 | 1.7 | 0.013 | 2.5 |
| >110 | 0.015 | 2.9 | 0.041 | 7.9 | 0.030 | 5.8 |
| TOTAL PORE VOLUME (Merc. Poros.) | 0.512 | | 0.520 | | 0.520 | |
| MODE PORE DIAMETER, Å (Merc. Poros.) | 74 | | 76 | | 84 | |
| SURFACE AREA m²/gram (B.E.T. method) | 293 | | 215 | | 210 | |

The test is conducted by contacting the catalysts in separate runs with the feedstock identified in Table V under hydroprocessing conditions. However, at the outset of each run, the respective catalysts are presulfided by contact for about 16 to 20 hours with a gas consisting of 90 volume percent $H_2$ and 10 volume percent $H_2S$ flowing at 4.4 SCFM (one atmosphere pressure). The temperature during the presulfiding is initially at room temperature, is increased gradually until 700° F. is reached, and then lowered to 450° F., at which time the catalyst is contacted with the feedstock.

TABLE V

| Feedstock Properties | |
| --- | --- |
| Feed Description | Kuwait Atmospheric Resid |
| Gravity, °API | 16.8 |
| Sulfur, wt. % | 3.7 |
| Total Nitrogen, wt. % | 0.270 |

TABLE V-continued

| Feedstock Properties | |
| --- | --- |
| Asphaltenes (C5), wt. % | 6.9 |
| Nickel, ppmw | 14 |
| Vanadium, ppmw | 49 |

| ASTM D-1160, Vol. % | Distillation, °F. |
| --- | --- |
| IBP/5 | 487/610 |
| 10/20 | 664/739 |
| 30/40 | 805/868 |
| 50/60 | 937/1028 |
| max. | 1108 |
| rec. | 73.0 |

A portion of the feedstock is passed downwardly through a reactor vessel and contacted in separate runs with Catalyst A and Catalyst X, in a single-stage, single-pass system with once-through hydrogen The operating conditions during each run are summarized as follows: 1,480 p.s.i.g. total pressure, 0.5 LHSV, a hydrogen rate of 4,100 SCF/bbl, and an initial temperature of 720° F.

Giving Catalyst X employed at 15 days in the reference hydroprocess an arbitrary activity of 100, relative activities of Catalysts A and B of the invention and Catalyst X for denitrogenation and desulfurization are determined by calculation and tabulated in comparison to Catalyst X in Table IV. These desulfurization activity determinations are based on a comparison of the reaction rates for desulfurization obtained from the data of the experiment according to the following standard equation which assumes second order kinetics for desulfurization:

$$\text{Relative Desulfurization Activity} = \frac{(1/S_p) - (1/S_f)}{(1/S_{pr}) - (1/S_{fr})} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

The relative volume activity (RVA) for sulfur conversion obtained for each catalyst is set forth in Table VI. The data in Table VI indicate that Catalysts A and B prepared from an impregnant solution and support particles having the indicated porosity are more active (i.e., at least about 10 percent) than the commercial catalyst.

TABLE VI

| Catalyst | RVA for sulfur removal, S |
| --- | --- |
| A | 133 |
| B | 112 |
| X | 100 |

EXAMPLE II

Catalyst A of Example I and another catalyst, Catalyst C, are tested in separate runs for hydroprocessing the feedstock of Example I under the same conditions as Example I.

Catalyst C is prepared in the same manner and with the same support particles as Catalyst A in Example I, except the AHM and cobalt amounts are reduced.

The dried and calcined finished catalyst has a nominal composition as set forth in Table VII.

TABLE VII

| Catalyst | MoO3 | CoO | RVA for sulfur removal, S |
| --- | --- | --- | --- |
| A | 12.0 | 3.0 | 133 |
| C | 9.6 | 2.4 | 104 |

The data in Table VII indicate that Catalyst C, containing less cobalt and molybdenum components than Catalyst A in Example I, is less active for desulfurization than Catalyst A in Example I.

EXAMPLE III

Catalyst A of Example I and two other catalysts, Catalysts D and E, are tested in separate runs for hydroprocessing the feedstock of Example I under the same conditions as Example I.

Catalysts D and E are prepared in the same manner and with the same support particles as Catalyst A in Example I, except: (1) in the preparation of Catalyst D, 21.62 grams of AHM are added to 25 ml of water and the resulting solution mixed with 28.5 ml of 28% ammonium hydroxide (NH4OH) solution and 24 ml of nickel nitrate solution containing 17.16 grams (Ni(NO3.6H2O) thereof; and (2) in the preparation of Catalyst E, 23.47 grams of AHM are added to 45 ml of water and the resulting solution mixed with 10.12 grams of 85 percent phosphoric acid (H3PO4) to dissolve the AHM and 18.59 grams of cobalt nitrate (Co(NO3)2.6H2O) is then dissolved therein.

The dried and calcined finished catalysts each have a nominal composition as set forth in Table VIII.

TABLE VIII

| Catalyst | MoO3 | CoO | P | RVA for sulfur removal, S |
| --- | --- | --- | --- | --- |
| A | 12.0 | 3.0 | — | 133 |
| D | 12.0 | 3.0 (NiO) | — | 111 |
| E | 12.0 | 3.0 | 2.9 | 115 |

The data in Table VI indicate that Catalyst D, containing nickel and molybdenum components, and Catalyst E, containing cobalt, molybdenum and phosphorus components, both prepared from the same support particles as Catalyst A in Example I, are active for desulfurization of residuum containing feedstocks.

While particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A catalytic hydroprocess of a hydrocarbon-containing oil containing nitrogen or sulfur, said hydroprocess comprising contacting a catalytic composition with said hydrocarbon-containing oil under hydroprocessing conditions so as to produce a product hydrocarbon-containing oil containing less nitrogen or sulfur than said hydrocarbon-containing oil, said catalytic composition consisting essentially of at least one cobalt metal hydrogenation component and at least one molybdenum hydrogenation metal component supported on an amorphous, porous refractory oxide, said composition having a pore size distribution wherein at least 75 percent of the total pore volume is in pores of diameter from about 20 angstroms below the mode pore diameter to about 20 angstroms above the mode pore diameter, less than 10 percent of said total pore volume is in pores of diameter less than 60 angstroms and greater than 3 percent to less than 10 percent of said total pore volume is in pores of diameter greater than 110 angstroms, said mode pore diameter of said composition is in the range from about 70 to about 90 angstroms.

2. The process defined in claim 1 wherein said hydrocarbon-containing oil comprises a residuum hydrocarbon feed.

3. The process defined in claim 1 wherein said hydrocarbon-containing oil further comprises contaminant metals.

4. The process defined in claim 3 wherein said hydrocarbon-containing oil contains less than 100 ppmw of said contaminant metals, calculated as Ni plus V.

5. The hydroprocess defined in claim 1 wherein at least 80 percent of the total pore volume is in pores of diameter from about 20 angstroms below the mode pore diameter to about 20 angstroms above the mode pore diameter.

6. The hydroprocess defined in claim 1 wherein greater than about 0.34 cc/gram of the total pore volume is in pores of diameter from about 20 angstroms above the mode pore diameter to about 20 angstroms below the mode pore diameter.

7. The hydroprocess defined in claim 1 wherein greater than about 0.39 cc/gram of the total pore volume is in pores of diameter from about 20 angstroms above the mode pore diameter to about 20 angstroms below the mode pore diameter.

8. The hydroprocess defined in claim 1 wherein greater than about 75 percent of the total pore volume is in pores of diameter from about 50 angstroms to about 100 angstroms.

9. The hydroprocess defined in claim 1 wherein greater than 85 percent of the total pore volume is in pores of diameter from about 50 to about 100 angstroms.

10. The hydroprocess defined in claim 1 wherein greater than about 50 percent of the total pore volume is in pores of diameter from about 10 angstroms below the mode pore diameter to about 10 angstroms above the mode pore diameter.

11. The hydroprocess defined in claim 1 wherein greater than about 55 percent of the total pore volume is in pores of diameter from about 10 angstroms below the mode pore diameter to about 10 angstroms above the mode pore diameter.

12. The hydroprocess defined in claim 1 wherein greater than 0.34 cc/gram of the total pore volume is in pores of diameter from about 50 to about 100 angstroms.

13. The hydroprocess defined in claim 1 wherein greater than about 0.37 cc/gram of the total pore volume is in pores of diameter from about 50 to about 100 angstroms.

14. The hydroprocess defined in claim 1 wherein 5 to 10 percent of said total pore volume is in pores of diameter greater than 110 angstroms.

15. The hydroprocess defined in claim 1 wherein about 7 to about 10 percent of said total pore volume is in pores of diameter greater than 110 angstroms.

16. The hydroprocess defined in claim 1 wherein greater than 0.015 cc/gram of said total pore volume is in pores of diameter greater than 110 angstroms.

17. The hydroprocess defined in claim 1 wherein greater than about 0.023 cc/gram of said total pore volume is in pores of diameter greater than 110 angstroms.

18. The hydroprocess defined in claim 1 wherein greater than about 0.030 cc/gram of said total pore volume is in pores of diameter greater than 110 angstroms 19. The hydroprocess defined in claim 1 wherein less than about 0.055 cc/gram of said total pore volume is in pores of diameter less than 60 angstroms.

20. The hydroprocess defined in claim 1 wherein greater than about 12 percent of said total pore volume is in pores of diameter greater than 90 angstroms.

21. The hydroprocess defined in claim 1 wherein said mode pore diameter is from 75 to 90 angstroms.

22. The hydroprocess defined in claim 1 wherein greater than about 0.03 cc/gram of said total pore volume is in pores of diameter greater than 100 angstroms.

23. The hydroprocess defined in claim 1 wherein greater than about 0.06 cc/gram of said total pore volume is in pore a of diameter greater than 90 angstroms.

24. The hydroprocess defined in claim 1 prepared by a method comprising the step of impregnating calcined, amorphous, porous refractory oxide support particulates with at least one precursor of said hydrogenation metal component, said calcined, amorphous, porous refractory oxide support having a pore size distribution wherein at least 80 percent of the total pore volume is in pores of diameter from about 20 angstroms above the mode pore diameter to about 20 angstroms below the mode pore diameter and at least about 4 to less than about 10 percent of the total pore volume is in pores of diameter greater than 110 angstroms, said mode pore diameter of said support is in the range from about 65 to about 85 angstroms.

25. The hydroprocess defined in claim 24 wherein said support has a total pore volume from about 0.4 to about 0.8 cc/gram.

26. The hydroprocess defined in claim 24 wherein a total pore volume is from about 0.4 to about 0.7 cc/gram.

27. A catalytic hydroprocess of a hydrocarbon-containing oil containing contaminant metals, nitrogen or sulfur, said hydroprocess comprising contacting a catalytic composition with said hydrocarbon-containing oil under hydroprocessing conditions so as to produce a product hydrocarbon-containing oil containing less nitrogen, sulfur or contaminant metals than contained in said hydrocarbon-containing oil, said catalytic composition consisting essentially of about 0.01 to about 6 weight percent of cobalt metal hydrogenation components, calculated as the monoxide, and about 1 to about 15 weight percent of molybdenum metal hydrogenation components, calculated as the trioxide, supported on an amorphous, porous refractory oxide containing alumina, said composition having a pore size distribution wherein at least 80 percent of the total pore volume is in pores of diameter from about 20 angstroms below the mode pore diameter to about 20 angstroms above the mode pore diameter, less than 10 percent of said total pore volume is in pores of diameter less than 60 angstroms and about 4 percent to less than 10 percent of said total pore volume is in pores of diameter greater than 110 angstroms, said mode pore diameter is in the range from about 70 to about 90 angstroms.

28. The hydroprocess defined in claim 27 consisting essentially of about 10 to about 14 weight percent of said molybdenum hydrogenation components, calculated as $MoO_3$, and about 2 to about 5 weight percent of said cobalt hydrogenation components, calculated as CoO.

29. The hydroprocess defined in claim 27 wherein said mode pore diameter is from 75 to 90 angstroms.

30. The hydroprocess defined in claim 27 wherein greater than 0.03 cc/gram of said pore volume is in pores of diameter greater than 110 angstroms.

31. The hydroprocess defined in claim 27 wherein less than 0.05 cc/gram of said pore volume is in pores of diameter less than 60 angstroms.

32. The hydroprocess defined in claim 31 wherein said amorphous, porous refractory oxide consists essentially of alumina.

33. The hydroprocess defined in claim 27 wherein at least about 0.40 cc/gram of said pore volume is in pores of diameter from about 50 to about 100 angstroms and at least about 0.035 cc/gram is in pores of diameter than 100 angstroms.

34. The hydroprocess defined in claim 27 wherein at least about 55 percent of said total pore volume is in pores of diameter from about 10 angstroms above to about 10 angstroms below the mode pore diameter and greater than 12 percent of said total pore volume is in pores of diameter greater than 90 angstroms.

35. The hydroprocess defined in claim 27 prepared by a method comprising the step of impregnating calcined, amorphous, porous refractory oxide support particulates with at least one precursor of said cobalt component and at least one precursor of said molybdenum components, said support particulates having a pore size distribution wherein at least 80 percent of the total pore volume is in pores of diameter from about 20 angstroms above the mode pore diameter to about 20 angstroms below the mode pore diameter and greater than about 4 percent to less than 10 percent of the total pore volume is in pores of diameter less than 110 angstroms, said mode pore diameter of said support particulates is in the range from about 65 to about 85 angstroms.

36. The hydroprocess defined in claim 35 wherein said support particulates have a total pore volume from about 0.45 to about 0.7 cc/gram.

37. The hydroprocess defined in claim 27 wherein greater than 5 percent of said total pore volume is in pores of diameter greater than 110 angstroms.

38. A process for catalytically hydroprocessing a hydrocarbon-containing oil wherein the catalytic composition is contacted with a hydrocarbon-containing oil under hydroprocessing conditions to produce a product hydrocarbon-containing oil containing hydrogenated components of said hydrocarbon-containing oil, said catalytic composition consisting essentially of about 10 to about 14 weight percent of molybdenum hydrogenation components, calculated as $MoO_3$, about 2 to about 5 weight percent of cobalt hydrogenation components, calculated as the monoxide, and supported on a porous, amorphous refractory oxide consisting essentially of alumina, said composition having a pore size distribution wherein at least 80 percent of the total pore volume is in pores of diameter from about 20 angstroms above the mode pore diameter to about 20 angstroms below the mode pore diameter, less than 10 percent of said total pore volume is in pores of diameter less than 60 angstroms and greater than 4 percent to less than 10 percent of said total pore volume is in pores of diameter greater than 100 angstroms, said mode pore diameter of said composition is in the range from about 70 to about 90 angstroms.

39. The process defined in claim 38 wherein said hydrocarbon-containing oil comprises a residuum hydrocarbon oil containing sulfur and said hydroprocessing conditions comprise hydrodesulfurization conditions and said hydrogenated components comprise hydrogen sulfide.

40. The process defined in claim 38 wherein greater than 5 percent of said total pore volume is in pores of diameter greater than 110 angstroms.

41. The process defined in claim 38 wherein at least about 7 percent of said total pore volume is in pores of diameter greater than 110 angstroms.

42. The process defined in claim 38 wherein at least 85 percent and at least 0.40 cc/gram of said total pore volume is in pores of diameter from about 50 to about 100 angstroms.

43. The process defined in claim 38 wherein said mode pore diameter is from 75 to 90 angstroms and at least 12 percent of said total pore volume is in pores of diameter greater than 90 angstroms.

* * * * *